Figure 1:
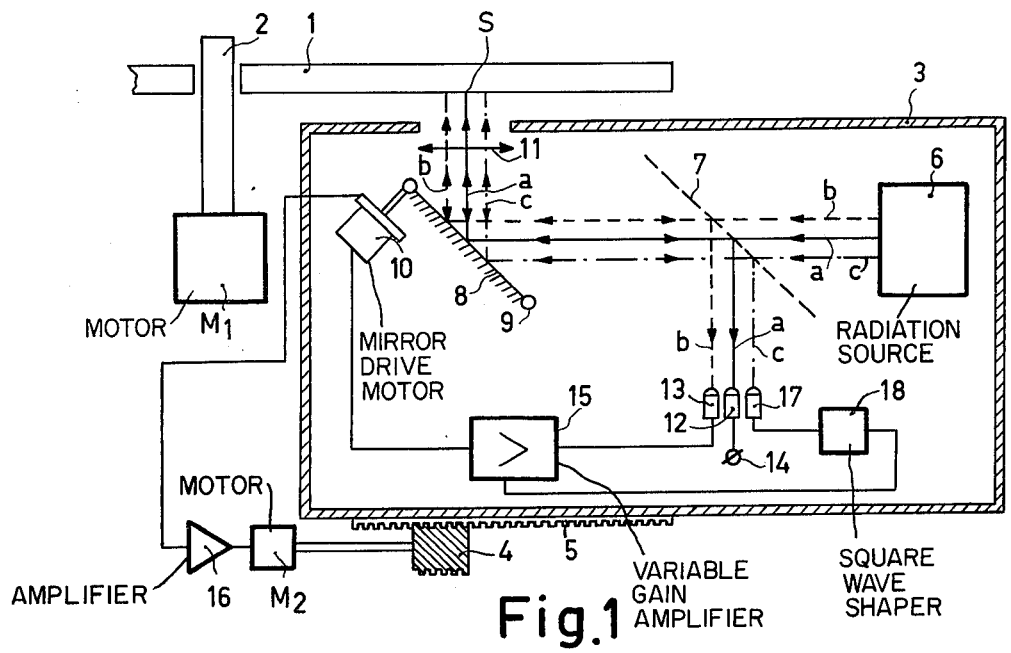

United States Patent [19]

Janssen

[11] 4,037,252
[45] July 19, 1977

[54] APPARATUS FOR READING A DISC-SHAPED RECORD CARRIER WITH PLURAL SCANNING SPOTS FOR STABLE RADIAL TRACKING

[75] Inventor: Peter Johannes Michiel Janssen, Emmasingel, Netherlands

[73] Assignee: U.S. Philips Corporation, New York, N.Y.

[21] Appl. No.: 623,550

[22] Filed: Oct. 17, 1975

Related U.S. Application Data

[63] Continuation of Ser. No. 442,501, Feb. 14, 1974, abandoned.

[30] Foreign Application Priority Data

Nov. 10, 1973  Netherlands .......................... 7315419

[51] Int. Cl.² ............................................... H04N 5/76
[52] U.S. Cl. ............................... 358/128; 179/100.3 V; 360/77; 250/202
[58] Field of Search .......... 178/6.6 R, 6.6 DD, 6.6 P, 178/6.7 A; 179/100.3 V, 100.3 B, 100.41 L; 360/77; 350/285; 250/202, 570; 358/128, 130, 132; 340/173 LM, 173 LT

[56] References Cited

U.S. PATENT DOCUMENTS

| 3,138,669 | 6/1964 | Rabinow ...................... 179/100.3 V |
|---|---|---|
| 3,381,086 | 4/1968 | Moss ............................. 179/100.3 V |
| 3,423,524 | 1/1969 | Bradford ...................... 179/100.3 V |
| 3,530,258 | 9/1970 | Gregg ................................ 178/6.7 A |
| 3,833,769 | 9/1974 | Compaan ..................... 179/100.3 V |
| 3,854,015 | 12/1974 | Janssen ......................... 179/100.3 V |
| 3,876,842 | 4/1975 | Bouwhuis ..................... 179/100.3 V |

OTHER PUBLICATIONS

"The Optical Scanning System of the Philips 'VLP' Record Player"; Philips Tech. Rev. 33; pp. 186-189, No. 7.

Primary Examiner—Bernard Konick
Assistant Examiner—Alan Faber
Attorney, Agent, or Firm—Frank R. Trifari; Simon L. Cohen

[57] ABSTRACT

An apparatus for reading a disc-shaped record carrier on which information is stored in a preferably spiral-shaped track. Said information is read optically with the aid of a radiation beam, which via a directing system transfers the information contained in the scanning point of the record carrier to a read detector. The radial position of the scanning point is controlled with the aid of a control system which via a first pattern of radiation spots which is projected onto the record carrier receives information about said radial position and by means thereof controls the directing system. In order to ensure that the system is stable under all conditions use is made of a second pattern of radiation spots which are projected onto the record carrier, which pattern is radially shifted relative to the first pattern, and from which a control signal is derived with which the transfer function of the control system is varied so as to stabilize the control system.

13 Claims, 16 Drawing Figures

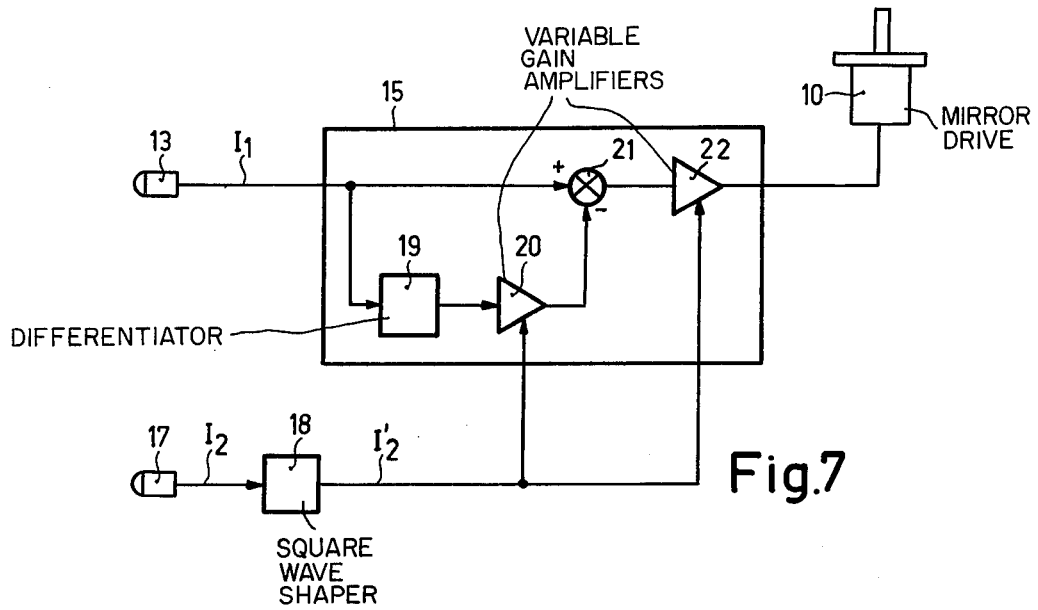
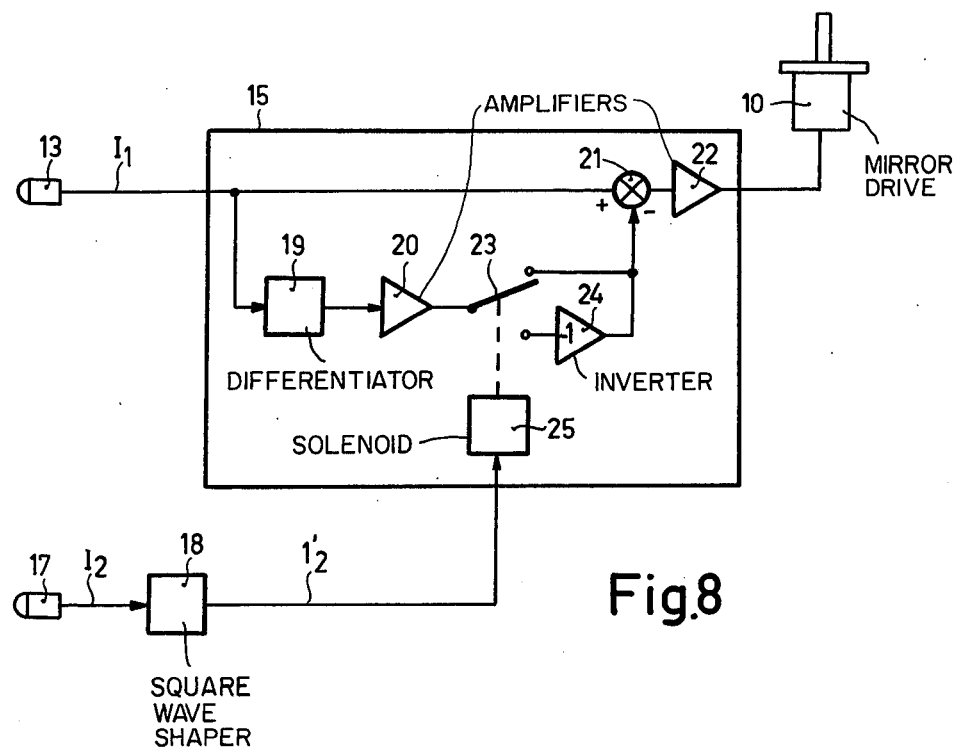

APPARATUS FOR READING A DISC-SHAPED RECORD CARRIER WITH PLURAL SCANNING SPOTS FOR STABLE RADIAL TRACKING

This is a continuation, of application Ser. No. 442,501, filed Feb. 14, 1974, now abandoned.

The invention relates to an apparatus for reading a disc-shaped record carrier in which signals are recorded in tangential tracks, which apparatus includes an optical read unit with a radiation source, a directing system and a read detector. The radiation source emits a radiation beam, which is projected onto the record carrier as a read spot of radiation. The directing system transfers the information contained in the scanning point of the record carrier to the read detector. A control system determines the radial position of the scanning point on the desired track, and includes a drive means for the directing system and a first measuring system for measuring the radial position of the scanning point and for supplying a corresponding first control signal to the drive means. The first measuring system employs a first pattern of radiation spots projected onto the record carrier. The pattern is imaged onto a first measuring detector. Ths first measuring system supplies a first control signal, which during a radial movement of the scanning point over a number of track distances contains a periodic alternating component whose period equals the track distance divided by the speed of the radial movement of the scanning spot. The control system is stable for one half period of said alternating component and is unstable for the other half period. In this respect the terms stable and unstable denote a decrease and increase respectively of the kinetic energy in the system as the scanning point passes through the relevant periods.

Such an apparatus is known from U.S. Pat. No. 3,854,015. The radial control system used therein serves to ensure that when the information recorded on the record carrier is being read the scanning point accurately follows the information track on said record carrier. Said record carrier may be provided with a multiplicity of concentric tracks, but generally the information track has a spiral shape. The method of modulation of the recorded signal and the method in which said signal is recorded on the record carrier is not essential for the present invention, so that it will not be discussed in further detail. As an example of a method of recording reference is made U.S. Ser. No. 229,285, filed Feb. 25, 1972, now abandoned in favor of U.S. Ser. No. 396,399, filed Sept. 12, 1973, which was abandoned in favor of U.S. Ser. No. 618,215, filed Sept. 30, 1975.

When the record carrier is provided with a spiral information track, the scanning point should be moved radially at approximately uniform speed. The uniform movement is generally obtained by moving the read unit in a radial direction. In addition, it should be possible to effect relatively small but rapid radial movements of the scanning point because, for example as a result of an eccentricity of the pivot relative to the center of the record carrier, there may be radial deviations in the position of the information track.

The radial displacements of the scanning point are effected with the aid of the control system, which consists of the drive means for the directing system and the first measuring system. The directing system usually consists of a reflecting element, which under the influence of the drive means can be subjected to a rotation and can thus reflect an incident beam of radiation at a variable angle. The directing system, like in U.S. Pat. No. 3,854,015, issued Dec. 10, 1974 can influence the direction of the radiation beam before the beam impinges on the record carrier or after the beam impinges on the record carrier and has already been modulated by the information contained therein. The record carrier itself may be either radiation-transmitting and radiation-reflecting.

The first measuring system for measuring the radial position of the scanning point may have different embodiments. For example, use can be made of a first pattern of radiation spots projected onto the record carrier by a radiation source, which pattern consists of two radiation spots which viewed in the radial direction are situated at either side of the scanning point, each of said radiation spots being imaged onto a separate part of the first measuring detector. The mutual magnitude of the signals produced by the images of the two radiation spots on the separate parts of the measuring detector will change in accordance with the position of the scanning point relative to the information track. By subtraction of the signals supplied by the separate parts of the first measuring detector, a first control signal is obtained which is unambiguously representative of the position of the scanning point relative to the information track. Another possibility is to image a number of tracks with the aid of a relatively large radiation spot onto a grating-shaped measuring detector as described in U.S. Patent 3,833,769.

In all these measuring systems a control signal is produced, which upon a radial displacement of the scanning point over a number of track distances comprises a periodic alternating component whose period equals the track distance divided by the speed of radial movement of the scanning spot. In this respect distance is to be understood to mean the distance measured in the radial direction between the center lines of two adjacent tracks. The alternating component is used as a control signal for the drive means of the directing system.

It has been found that in the case of a radial displacement of the scanning point over a number of track distances, the control system is in a stable state for half a period of the periodic alternating component, and in an unstable state during the other half period of said alternating component. This is because the alternating component, which is used as a control signal for the drive means of the directing system, has a positive slope during one half period and a negative slope during the other half period, so that in the event of a change of the radial position of scanning point the variation of the control signal which is applied to the drive means is of opposite sign.

Normally, this property of the control system presents few problems, because the system, once it is in the stable range, will always remain in the stable range under normal conditions. However, if the control system leaves the stable range owing to a disturbance, for example owing to a shock or a flaw in the record carrier, this property may cause a relatively large, substantially undamped oscillation, so that the scanning point may effect an oscillation over a number of track distances in a radial direction, and a correct reading of the information is not possible until after a certain, sometimes comparatively long, time after the occurrence of the disturbance.

It is an object of the invention to provide an apparatus in which this problem is eliminated. The invention is therefore characterized in that for assuring the stability of the control system a second measuring system is provided, which employs a second pattern of radiation spots which is projected onto the record carrier and which is imaged onto a second measuring detector. The second measuring system supplies a second control signal, which upon a radial movement of the scanning point over a number of track distances comprises a periodic alternating component whose period equals the track distance divided by the speed of radial movement of the scanning spot, but which alternating component, as a result of a deviating radial positon of the second pattern of radiation spots relative to that of the first pattern of radiation spots exhibits a phase shift of at least substantially a quarter period relative to the alternating component of the first control signal, and that the control system has a variable transfer function which is controlled by a control unit which receives a control signal derived from the second control signal, and which control unit upon a movement of the scanning point over a number of track distances controls the transfer function so as to stablize the control system.

By means of the second measuring system a second control signal is obtained which provides an indication on whether or not the control system is in the stable range. Since the alternating component of said second control signal relative to the alternating component of the first control signal exhibits a phase shift of at least substantially a quarter period, the half period of the one polarity of the alternating component corresponds to a half periof of the alternating component of the first control signal with a slope of a first signal, and the other half period of the opposite polarity of said alternating component of the second control signal with the other half period of the alternating component of the first control signal with a slope of opposite sign.

The second control signal can be used to produce a control signal, which influences the transfer function of the control system when said system comes into its unstable range in such a way that as said control system passes through a stable and an unstable range the kinetic energy exchange during the passage of the unstable range is smaller than the energy exchanged during the passage through the stable range. For this purpose, various possibilities are available. First of all, the gain of the control system may be reduced as the control system passes through the unstable range. A second possibility is the reduction of the damping term in the control system, which gives rise to a negative damping in the unstable range. Finally, the sign of said damping term may be reversed in the unstable range, so that is provides a positive damping in this range.

Moreover, the second control signal may be used for deriving a directional control signal which provides an indication of the direction in which the scanning point is moved in a radial sense. This directional control signal can be obtained by differentiation of the second control signal. Thus, a signal is obtained which is in phase or in phase opposition relative to the first control signal, depending on the direction of movement of the scanning point. By controlling the transfer function with the aid of this signal an unambiguous stabilizing action results, because depending on the direction of movement the transfer function is varied either during the positive or during the negative period of the first control signal.

It is also possible to multiply the differentiated second control signal by the first control signal, so that a signal is obtained whose polarity is a direct indication of the direction of movement of the scanning point. This information may than be used for influencing the transfer function, either during the positive or during the negative period of the first control signal.

In addition to these two possibilities, a number of complementary steps may be taken, which will be further outlined in the description.

The second measuring system may have different embodiments in accordance with the desired accuracy. In a preferred embodiment the second pattern of radiation spots consists of two radiation spots which are radially shifted relative to each other by a distance equal to half the track distance and which are each imaged onto a separate part of the second measuring detector, a second control signal being obtained by subtraction of the signals supplied by said separate parts of the second measuring detector. Said embodiment has the advantage that the second control signal thus obtained merely contains an alternating component, while the d.c. component normally presents in the signal formed by imaging a radiation spot on a measuring detector is eliminated by the subtraction. This d.c. component is both time-dependent as a result of noise in the radiation energy supplied by the radiation source and location-dependent as a result of differences in the radiation absorption and/or reflection as a function of the location on the record carrier and as a function of the location where the radiation beam in the read unit is transmitted, in particular of the lens systems used.

In a second preferred embodiment the second measuring signal is obtained by measuring the signal received by the read detector itself, specifically, the low-frequency variations of this signal. This embodiment has the advantage that no additional measuring detector is required, but on the other hand it has the drawback that the supplied control signal contains a d.c. component which may give rise to a less accurate operation.

Figure 2:
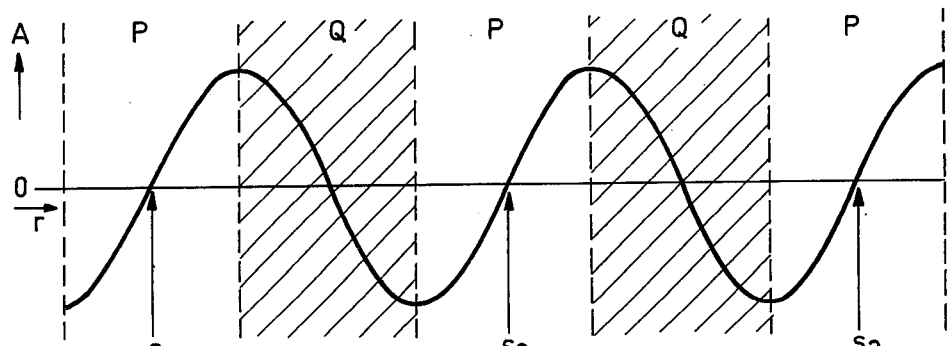
Figure 3:
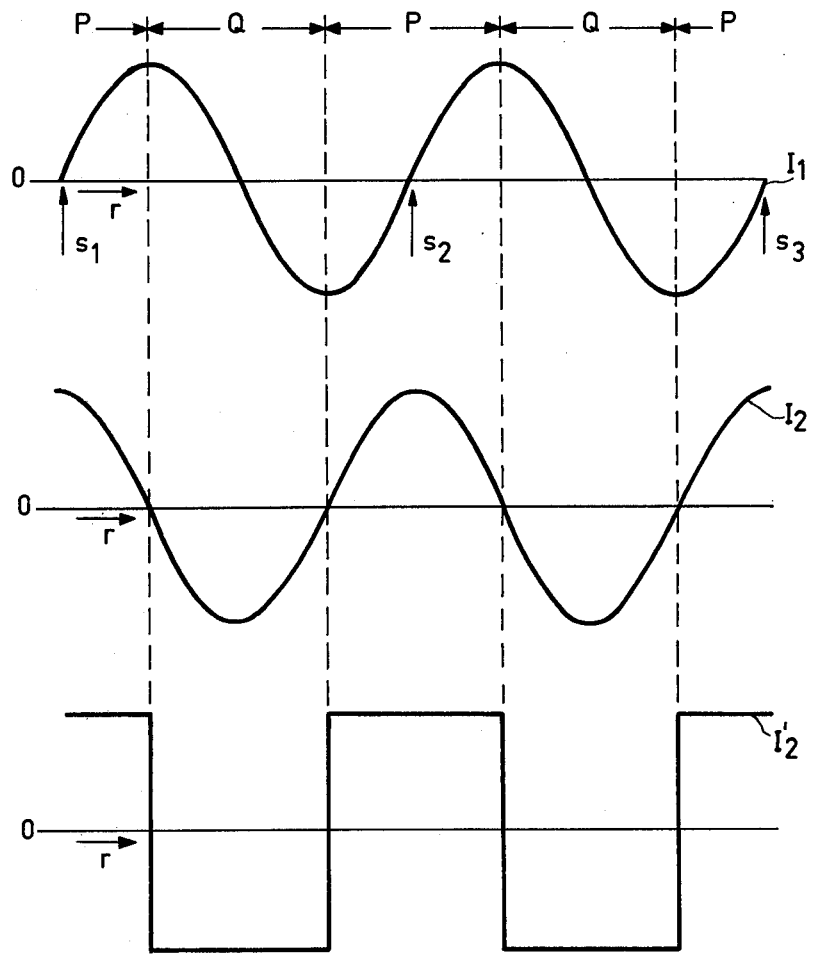
Figure 4:
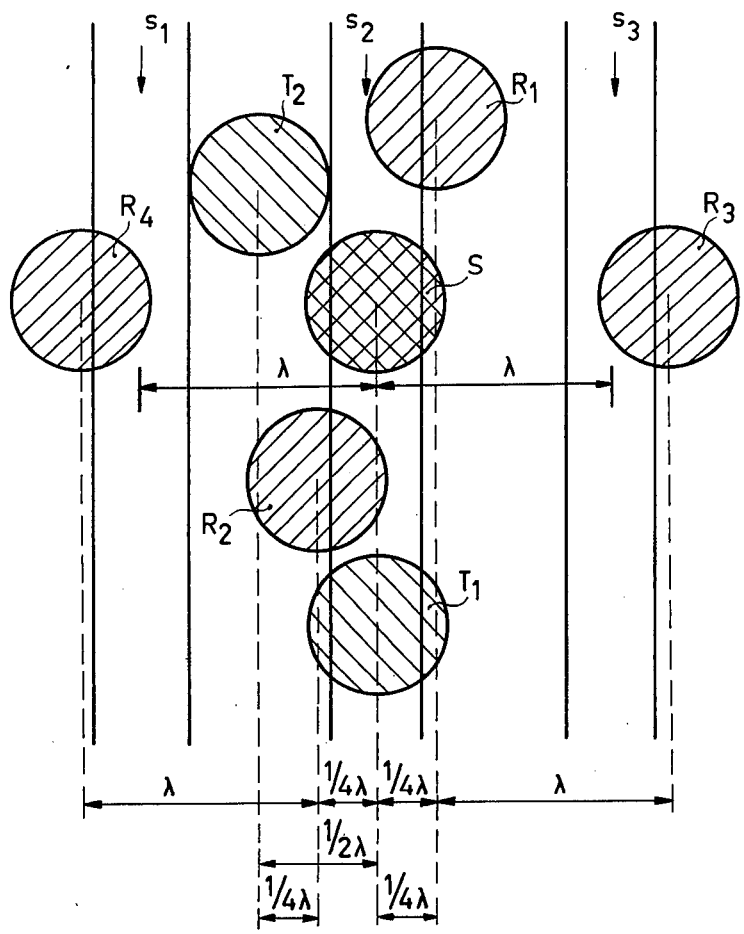
Figure 5:
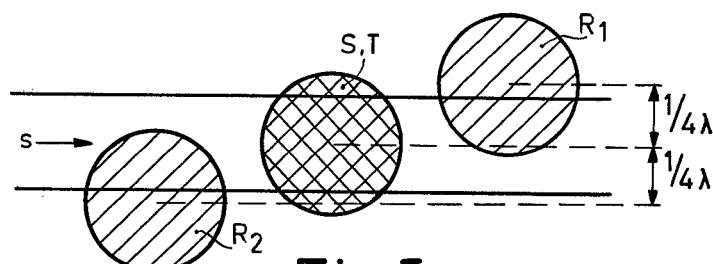
Figure 6:
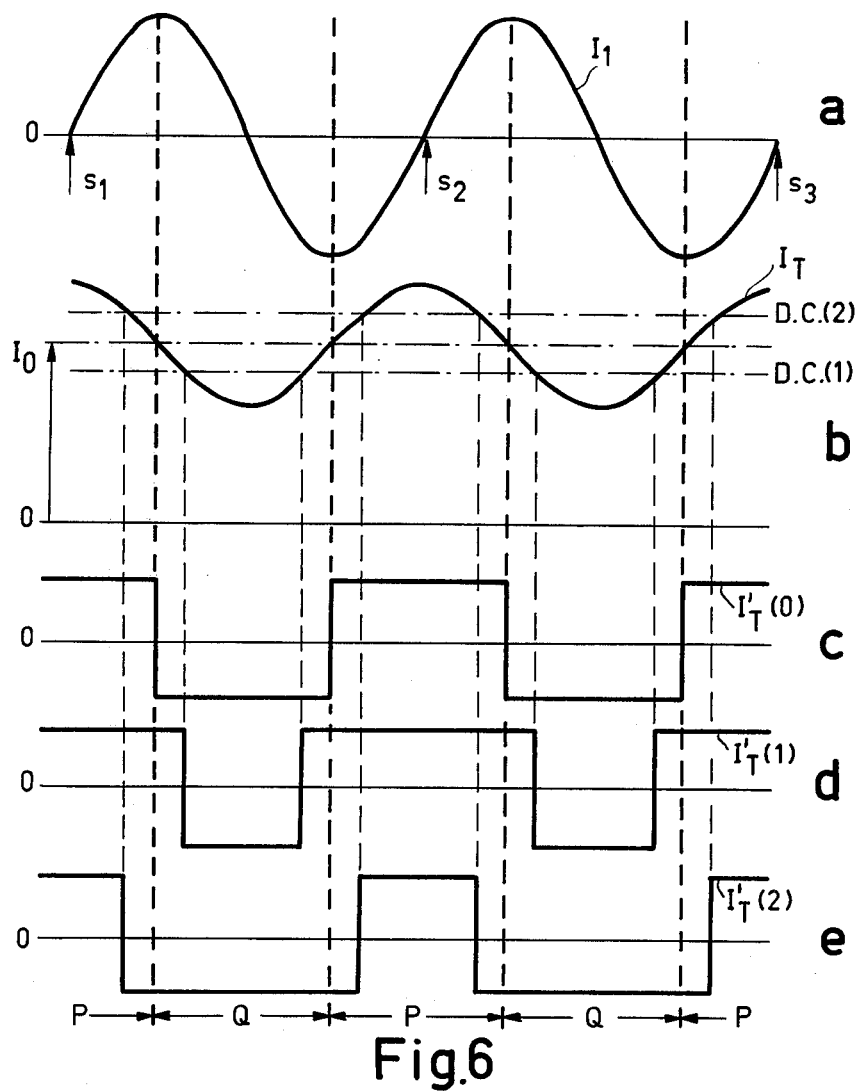
Figure 9:
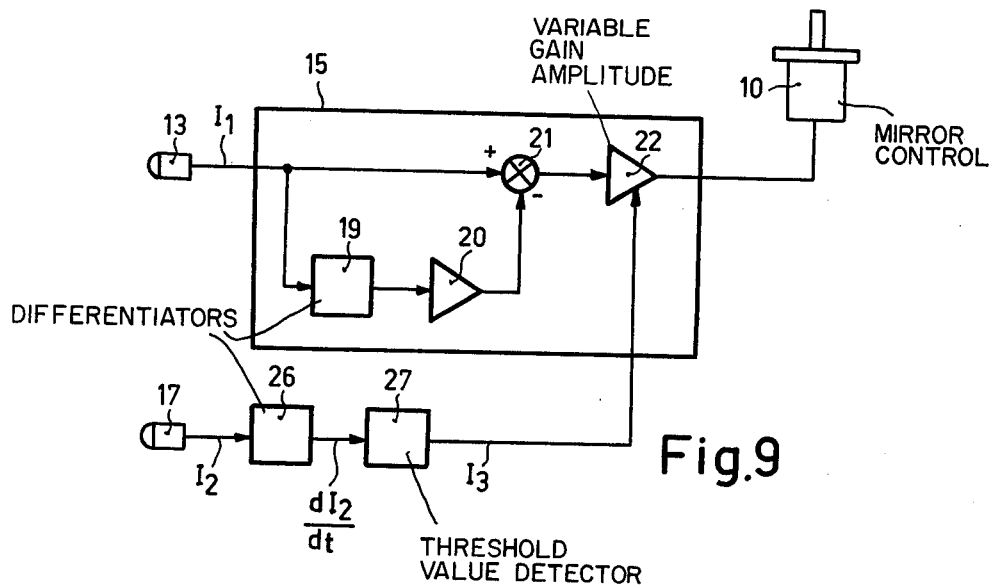
Figure 11:
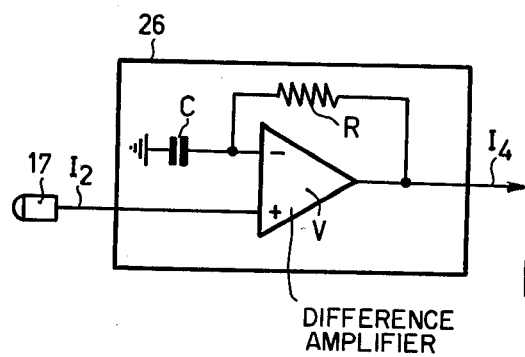
Figure 12:
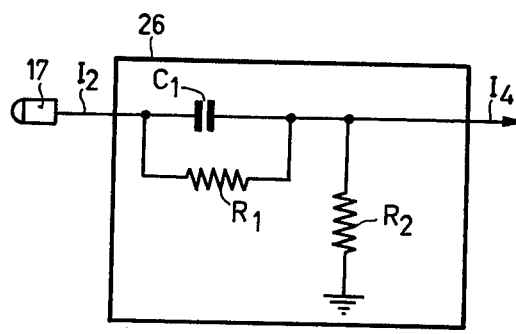
Figure 10:
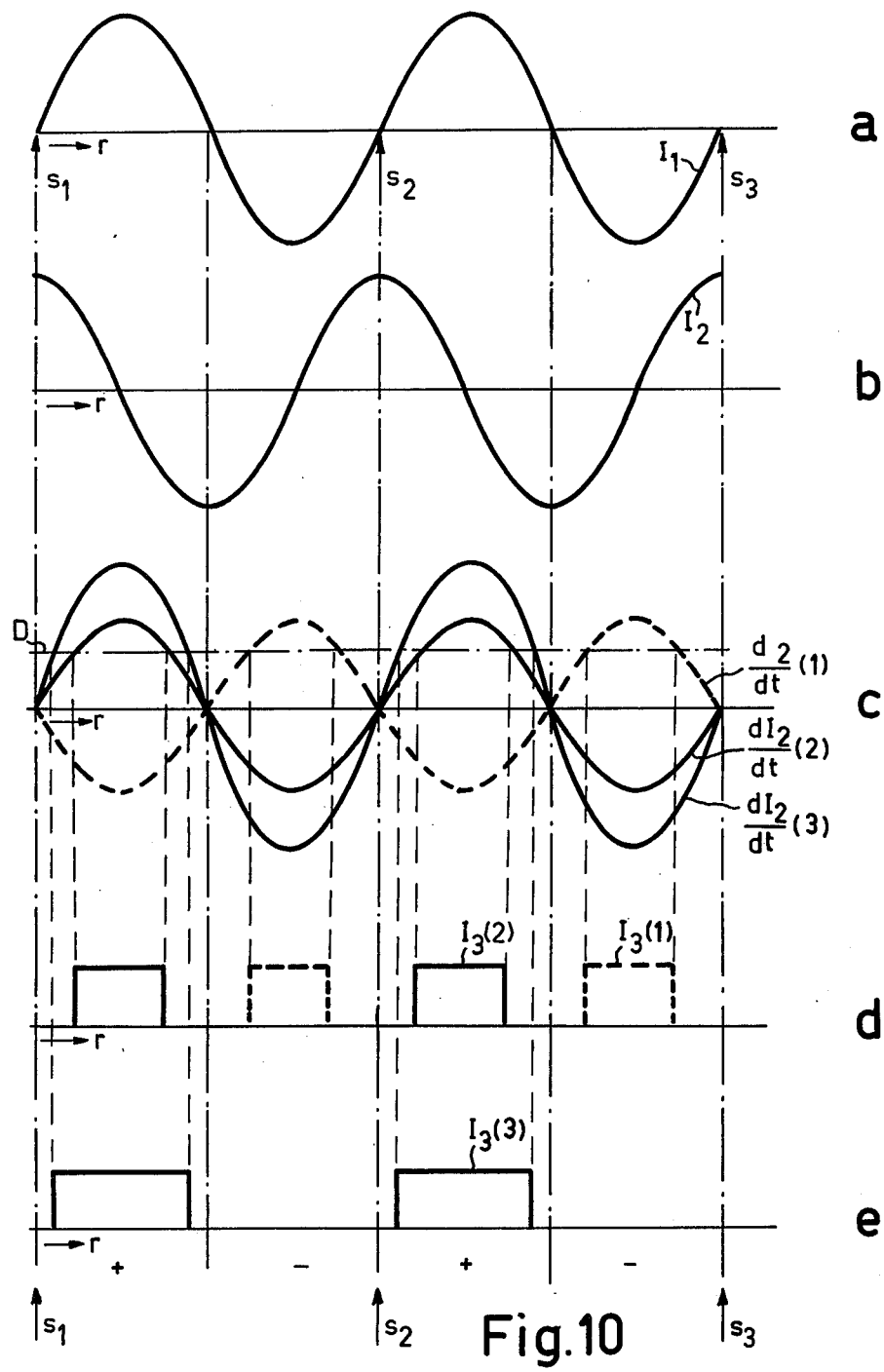

The invention will now be described in more detail, by way of example, with reference to the drawing, in which:

FIG. 1 shows an embodiment of the read apparatus according to the invention, and FIGS. 2 and 3 show the associated control signals, FIGS. 4 and 5 show two methods of obtaining the desired control signal, and FIG. 6 shows a number of signal characteristics in illustration of the method of FIG. 5, FIGS. 7 and 8 show two methods of influencing the transfer characteristic of the servo-unit in accordance with the control signal, FIG. 9 in conjunction with FIG. 10 a through e, shows an alternative method of obtaining the desired stabilization, and FIGS. 11 and 12 shows two embodiments of the differentiation circuit employed for this, in order to obtain a special effect.

In FIG. 1 the reference number 1 designates a disc-shaped record carrier, which at its underside is provided with a multiplicity of concentric or quasiconcentric tracks, not shown. In these tracks the information can be recorded in various known manners. As an example, reference is made to U.S. Ser. No. 229,285, filed Feb. 25, 1972, now abandoned in favor of U.S. Ser. No. 396,399, filed Sept. 12, 1973, which was abandoned in favor of U.S. Ser. No. 618,215, filed Sept. 30, 1975, in which the information track contains blocks and areas whose length represents the stored information. These blocks and areas have a different effect on a radiation beam which is projected onto the information track, so that the radiation beam is modulated in accordance with the recorded information. For example, the transmission or reflection coefficient of the blocks may differ from that of the areas, so that a read beam of radiation is amplitude modulated. In a reflecting record carrier it is equally possible to dispose the blocks and areas at different levels, the difference in depth being one fourth of the wavelength of the radiation used for reading. The read beam of radiation is then phase modulated. As the method of modulation and the method of recording the signal which is recorded on the record carrier are only of secondary importance for the present invention, there will not be discussed in more detail.

The record carrier 1 is rotated by a motor $M_1$ via a shaft 2 which extends through a central opening in the record carrier. The information stored in said record carrier 1 is read with the air of a beam of radiation, which after interaction with the record carrier is detected with the air of an optical read device, which is accommodated in a housing 3. This optical read apparatus, which substantially corresponds to that described in U.S. Pat. No. 3,854,015 includes a light source 6, which emits a read beam of radiation a. Via a semitransparent mirror 7 the beam of radiation a reaches a plane mirror 8, so that the radiation beam is reflected in the direction of the record carrier 1. This reflected beam of radiation a is focussed ina scan spot S at the lower surface of the record carrier 1 by a lens 11. The radiation beam which is reflected by the record carrier is again reflected towards the semi-transparent mirror 7 by the plane mirror 8 and by the mirror 7 to a read detector 12, on which the scanning point S of the record carrier is thus imaged, and which detects the information contained in the beam of radiation. The detected information is then eventually available for further processing at an output terminal 14.

To guarantee a continuous reading of the information stored on the record carrier the scanning point S which is imaged on the read detector 12 should continually follow the information track of the record carrier. If the information track is spiral shaped, this means that the scanning point S must first of all be moved in a radial direction at a speed which corresponds to the pitch of the spiral information track. Furthermore, the scanning point S must be capable of following possible radial movements of the information track, for example those resulting from an eccentricity of the "central" opening of the record carrier.

This necessary control of the radial position of scanning point S is established by co-operation of two control systems, namely a coarse control which can only effect a slow radial displacement of the scanning point and a fine control which can only perform a relatively small but rapid radial displacement of the scanning point. In the embodiment shown the coarse control is obtained with the aid of a motor $M_2$, which via a servo-amplifier 16 receives a control signal and which by means of a transmission, for example the worm gear 4 and the gear rack 5, can move the housing 3 in the radial direction. Fine control is effected with the aid of the plane mirror 8 which is rotatable about a spindle 9.

Rotation of the mirror 8 is effected by a drive element 10, for which various elements may be employed, a number of possibilities being in the cited U.S. Pat. No. 3,854,015. Said drive element receives a control signal from a servo-unit 15.

The information concerning the radial position of the scanning point S relative to the desired track which is required for said control is obtained with the aid of a radiation beam b, which is produced by the radiation source 6, and which also impinges on the lower surface of the record carrier 1 via the semi-transparent mirror 7, the mirror 8 and the lens 11. After reflection the radiation beam b via the mirror 8 and the semi-transparent mirror 7 reaches a control detector 13 whose output signal is fed to the servo-unit 15. As a control signal for coarse control, which is to be applied to the servo-amplifier 16, a signal is employed which is a measure of the average deviation of the mirror 18 relative to central position. Such a signal can be obtained in various manners, which are obvious to those skilled in the art, for example with the aid of capacitive or inductive transducers, which is the reason why FIG. 1 only schematically indicates how the desired control signal is taken from the drive element 10.

Depending of the composition of the radiation beam b the control detector 13 may have different embodiments. As a first example reference is made to U.S. Pat. No. 3,833,769. The control detector described here consists of a grating of radiation-transmitting and radiation-absorbing strips, onto which via the radiation beam b a number of tracks of the record carrier are imaged. The position of the grating-shaped image of the track pattern relative to the grating-shaped detector by means of suitable transducer elements provides a control signal which is representative of the position of the scanning point S relative to the desired track. As a second example reference is made to U.S. Pat. No. 3,876,742. In this embodiment two radiation spots are projected at either side of the scanning point by the radiation beam b and the control detector consists of two separate sub-detectors, on each of which one one of the radiation spots is imaged. The intensity of the two imaged radiation spots varies in accordance with the radial position of the scanning point and subtraction of the output signals of the sub-detectors yields a suitable control signal.

Generally, a control signal is obtained with the aid of the control detector 13, which signal as a function of the radial position of the scanning point is substantially as shown in FIG. 2. Apart form a possible d.c. component said control signal conains an a.c.component divided by the speed of radial movement of the scanning spot i.e. the distance between the center lines of two adjacent tracks. FIG. 2 shows a purely sinusoidal shape. However, it will be evident that depending on the detector system used the sinusoidal shape may deviate. For simplicity, only the sinusoidal control signal will be discussed hereinafter.

FIG. 2 represents the control signal which is obtained upon a displacement of the scanning point over 3 track distances. The control system is assumed to be in the stable state at the points where the control signal is zero and the slope positive, i.e. points $s_1$, $s_2$ and $s_3$, which consequently correspond to the centers of the adjacent tracks. For example, if the scanning point moves from the track $s_1$ towards a higher value of the radius r, a positive control signal is produced, depending on which the control system is assumed to force the scanning point back to said position $s_1$. For a displacement of the scanning point towards a smaller value of r it is obvious that the reverse applies.

However, if the scanning point enters a range Q, which corresponds to a negative slope of the control signal, the control system suddenly becomes unstable. As it passes through the range Q, the system gains energy, which implies that if the scanning point transverses a full track distance owing to a disturbance, it will automatically traverse more track distances.

As a result of an extraneous disturbance the scanning point S may be moved over a number of track distances, which number is first of all determined by the deviation of the mirror at the instant of the disturbance, As the coarse control is also actuated for a rotation of the mirror S which corresponds to said displacement, a substantially undamped oscillation of the scanning point over a number of track distances may occur owing to interaction of the fine and the coarse control, so that at least for a certain time reading of the information stored on the record carrier becomes impossible.

In order to remedy this, the radiation source 6 in the read apparatus of FIG. 1 emits a third radiation beam $c$, which via the semi-transparent mirror 7, the mirror 8 and the lens 11 impinges on the record carrier. The portion of the third radiation beam that is reflected by the record carrier is again reflected to an additional detector 17 via the mirror 8 and the semitransparent mirror 7. The additional detector 17 supplies an additional control signal, whose shape substantially corresponds to the shape of the control signal supplied by the control detector 13. As a result of separation in radial position of the pattern of radiation spots which is projected onto the record carrier by the radiation beam $c$ relative to the pattern of radiation spots which is projected onto the record carrier by the radiation beam $b$, the additional control signal exhibits a phase shift of 1/4 period relative to the control signal supplied by the control detector 13.

For clarity the two control signals are shown in FIG. 3. The control signal $I_1$, which is supplied by the control detector 13 corresponds to the control signal shown in FIG. 2. The control signal $I_2$ supplied by the additional detector 17 has the same shape as the control signal $I_1$ as a function of $r$, but is phase shifted by ¼ period. From control signal $I_2$ a control signal $I_2'$ can be derived in a simple manner, which has a first positive value when the control signal $I_2$ is positive and a second negative value when said control signal $I_2$ is negative. It is then evident from FIG. 3 that the positive value of the control signal $I_2'$ corresponds to the stable ranges P of the control signal $I_1$ and the negative value to the unstable ranges Q. For this, it is assumed that a positive value of the first control signal $I_1$ causes a displacement of the scanning point towards smaller values of $r$ and a negative value a displacment towards higher values. The control signal $I_2'$ thus provides an indication of whether the control system is in a stable range P or in an unstable range Q. This information is used for influencing the control system during at least a part of the time that said control system is an unstable range.

The control signal $I_2'$ derived from the additional control signal of the detector 17 by a converter 18, in this case a squarewave generator, is fed to the servo-unit 15 which is included in the control system, and which, depending on the value of the control signal $I_2'$ may have two possible transfer functions. Obviously, the first transfer function, which is operative in the stable control range P, serves to obtain an optimum control behavior within the stable range. The second transfer function, which is operative in the unstable range Q, has such a deviating transfer function, that while the scanning point passes through a number of stable and unstable ranges P and Q respectively, the energy exchanged by the servo-unit 15 during passage through the unstable ranges Q is smaller than the energy exchanged during passage through the stable ranges P. This ensures that upon the occurrence of an external disturbance, a damped oscillation is produced in any case, so that the scanning point is at any rate restored to a stable setting. How fast this happens of course depends on the degree and the manner in which the transfer functions of the servo-unit 15 are varied. Naturally, if desired, the signal $I_2$ can also be used directly as a control signal and continuously vary the transfer function by means of this signal, at least during the unstable periods.

However first of all some possibilities of obtaining the desired control signals $I_1$ and $I_2$ will be described. A first possibility is represented in FIG. 4. By $s_1$, $s_2$ and $s_3$ a part of three adjacent tracks is designated. The track centers are spaced at a track distance $\lambda$ from each other. S is the scanning spot, i.e. the area of the record carrier which is eventually imaged onto the read detector 12. The pattern of radiation spots of the radial control system basically consists of two radiation spots $R_1$ and $R_2$, which are situated at either side of the scanning spot S in the radial direction at a distance of ¼$\lambda$. The additional pattern of radiation spots obtained with the aid of the radiation beam $c$ comprises the two radiation spots $T_1$ and $T_2$. The radiation spot $T_1$ is radially shifted relative to the radiation spot $R_1$ by a distance of ¼$\lambda$, and the radiation spot $T_2$ is shifted by the same distance relative to the radiation spot $R_2$. Each of the radiation spots is eventually imaged onto a separate detector or subdetector.

Generally, the signal $I_{det}$ supplied by such a detector as a result of the radiation spot imaged thereon may be written in terms of:

$$I_{det} = I_o \left( 1 + m \sin \frac{r}{\lambda} \cdot 2\pi \right) \quad (1)$$

$I_o$ being the energy supplied by the radiation beam at the location of the radiation spot, $m$ being the amplitude of the a.c. component upon a radial displacement of the radiation spot, $r$ being the radial position of said radiation spot, and $\lambda$ being the track distance.

Assuming that the image of the radiation spot $R_2$ actually results in the said signal, i.e.

$$I_{R2} = I_o \left( 1 + m \sin \frac{r}{\lambda} 2\pi \right) \quad (2)$$

the image of the radiation spot $R_1$ will yield a signal $$I_{R1} = I_o \left( 1 + m \sin \frac{r + \frac{1}{2}\lambda}{\lambda} 2\pi \right) = I_o \left( 1 - m \sin \frac{r}{\lambda} 2\pi \right) \quad (3)$$

Subtracting the signal $I_{R_1}$ from the signal $I_{R_2}$ yields the following control signal $$I_1 = 2m \sin \frac{r}{\lambda} \cdot 2\pi \quad (4)$$

which is entirely in accordance with the waveform $I_1$ shown in FIG. 3.

Similarly, the image of the radiation spot $T_1$ yields the signal $$I_{T1} = I_o\left(1 + m \sin\frac{r + \frac{1}{4}\lambda}{\lambda} 2\pi\right) = I_o\left(1 + m \cos\frac{r}{\lambda} 2\pi\right) \quad (5)$$

and the image of the radiation spot $T_2$ gives the signal $$I_{T2} = I_o\left(1 + m \sin\frac{r - \frac{1}{4}\lambda}{\lambda} 2\pi\right) = I_o\left(1 - m \cos\frac{r}{\lambda} 2\pi\right) \quad (6)$$

Subtracting the signal $I_{T_2}$ from the signal $I_{T_1}$ yields as additional control signal $$I_2 = 2m \cos\frac{r}{\lambda} 2\pi \quad (7)$$

which is fully in accordance with the signal waveform $I_2$ of FIG. 3.

If desired, the number of radiation spots for obtaining the desired control signal may be increased. FIG. 4 by way of example shows two additional radiation spots $R_3$ and $R_4$, the radiation spot $R_3$ being located at a distance $\lambda$ from the radiation spot $R_1$ and the radiation spot $R_4$ at a distance $\lambda$ from the radiation spot $R_2$. The signals $I_{R_3}$ and $I_{R_4}$ resulting from the radiation spot $R_3$ and $R_4$ respectively are therefore fully in phase with the signals $I_{R_1}$ and $I_{R_2}$ resulting from the images of the radiation spots $R_1$ and $R_2$ respectively. When taking $(I_{R_2} + I_{R_4}) - (I_{R_1} + I_{R_3})$ as a control signal, the resulting signal is entirely in phase with the control signal $I_1$ but has twice the amplitude.

The use of the additional radiation spots has some substantial advantages. First of all, as previously stated, the amplitude of the control signal thus obtained is doubled. Secondly, the effect of deviation in the distance of the tracks is reduced, because the additional radiation spots result in a certain averaging. Furthermore, the influence on the control signal of the information which is contained in the tracks is reduced. Normally, the high-frequency information is removed with the aid of filters. Since the additional radiation spots also result in a certain averaging with respect to this parameter, the influence of this information component is automatically reduced. Naturally, it is also possible to use more than two additional radiation spots, so that the said effects become more marked. Further, the radiation spot $R_3$ may be situated at a track distance $\lambda$ from the radiation spot $R_2$, i.e. between the tracks $s_2$ and $s_3$ and the radiation spot $R_4$ at a track distance $\lambda$ from the radiation spot $R_1$, i.e. between the tracks $s_1$ and $s_2$. The desired control signal is then represented by $(I_{R_2} + I_{R_3}) - (I_{R_1} + I_{R_4})$.

A second possibility of obtaining the desired control signals is represented in FIG. 5, the associated waveforms being shown in FIG. 6. FIG. 5 shows a track $s$, on which a scanning spot S is projected. At either side of said scanning spot two radiation spots $R_1$ and $R_2$ are projected, which are radially shifted by a distance of $\frac{1}{4}\lambda$ relative to the scanning spot S. By means of the radiation spots $R_1$ and $R_2$ the control signal $I_1$ is obtained in a manner identical to that described with reference to FIG. 4, which signal again complies with the formula (4) and which is shown in FIG. 6a.

However, in this case the additional control signal is not obtained with the aid of additional radiation spots, but is derived from the signal obtained by imaging the scanning spot S on the read detector. Generally, the information contained in the information track will have a higher frequency than the maximum control frequency. As a result, the low-frequency signal component can be extracted from the signal supplied by the read detector with the aid of filters. The signal component, except for a phase shift, complies with the general formula (1) and may be written in terms of $$I_T = I_o\left(1 + m \sin\frac{r + \lambda/4}{\lambda} \cdot 2\pi\right) = I_o\left(1 + m \cos\frac{r}{\lambda} 2\pi\right) \quad (8)$$

Said signal $I_T$, shown in FIG. 6b, contains an a.c. component which is suitable for deriving the desired control signal. With the aid of a separator stage the d.c. component $I_o$ can be extracted, after which the desired control signal $I_T'$ (o), shown in FIG. 6c, can be derived from the remaining a.c. component, whose periods again accurately correspond to the stable and unstable ranges of the control system.

A problem associated with this embodiment is the presence of the d.c. component in the control signal $I_T$. Said d.c. component $I_o$ is not entirely constant, but is both time and location dependent. The time dependence is mainly caused by variations in the intensity of the radiation emitted by the radiation source. The location dependence is caused by a difference in absorption and/or reflection in accordance with the position of the record carrier and the location where the beam of radiation is transmitted through the optical system, in particular the lenses.

In order to obtain an insight into the consequences of these two variations of the d.c. component $I_o$ in the control signal $I_T$, may be represented by variations of the d.c. level which is extracted from the control signal $I_T$. Indeed, the extraction may give rise to additional variations. Assuming that instead of the correct d.c. level $I_o$ the D.C. level D.C.(1) is extracted, which is lower than $I_o$, a control signal $I_T'(1)$ is derived from the residual a.c. component, which control signal is shown in FIG. 6d. This reveals that only a part of the unstable ranges Q is actually identified as an unstable range by the control signal $I_T'(1)$. This is still acceptable because at any rate during a part of the unstable ranges the stabilizing steps can be taken, so that a possible oscillation is damped anyway. However, assuming that instead of the d.c. level $I_o$ the higher d.c. level D.C.(2) is extracted, a control signal $I_T'(2)$ as shown in FIG. 6e will be derived from the residual a.c. component. This control signal $I_T'(2)$ even identifies parts of the stable ranges P as unstable regions, so that during a part of the stable ranges the transfer function destined for the unstable ranges is rendered effective. Said transfer function may then cause an unstable behavior in the relevant part of the "stable" range, which of course is highly undesirable. However, by a suitable choice of the transfer function, it can be achieved that even for this incorrect identification of the stable and unstable ranges a stable system is retained in the stable range under all conditions. This will be discussed in more detail when describing the embodiments of the servo-unit shown in FIGS. 7 and 8.

A method of eliminating said undesired d.c. component of the control signal $I_T$ is the formation of the sum of the signals produced by the radiation spots $R_1$ and $R_2$, i.e. the sum of the signals which are represented by the formulas (2) and (3). This sum signal equals $2I_o$ and therefore only contains the d.c. component. This allows said sum signal to be used for the compensation of the d.c. component $I_o$ contained in the control signal $I_T$, because the two components are always substantially subject to the same variations.

The embodiment of the apparatus according to the invention shown in FIG. 7 includes a servo unit 15, which receives its input signal from the control detector 13 and supplies a control signal for the drive means 10 of the mirror. The control signal supplied by the control detector 13 is applied both to an adder unit 21 and to a differentiator 19. Via an amplifier 20 the output signal of the differentiator 19 is inverted and applied to the adder unit 21. The output signal of the adder unit is finally amplified by the amplifier 22 and then serves as an output signal of the servo-unit. The differentiator 19 together with the amplifier 20 provides the desired damping term in the transfer function of the servo-unit 15.

The transfer function of the servo-unit is influenced by a control signal which via a squarewave shaper 18 is derived from the control signal $I_2$ which is supplied by the detector 17 and which consequently corresponds to the control signal $I_2'$ shown in FIG. 3. This control signal may be applied to either or both amplifiers 20 and 22. If the control signal is fed to the amplifier 22, steps can be taken to reduce the gain factor of the transfer function of the servo amplifier in the unstable ranges of the control system. If the control signal is applied to the amplifier 20, the absolute value of the damping term in the unstable ranges of the control system can be reduced. In an unstable range, because of the opposite slope of the control signal which is supplied by the control detector 13 as a function of the radius $r$ the damping term give rise to a negative damping whose influence is diminished by the reduction of the gain factor of amplifier 20.

In the method of obtaining the control signal described with reference to FIGS. 5 and 6 the method of influencing the transfer function of the servo-unit is preferred. The reduction of the gain factor of the amplifiers may then be selected so that the resulting reduced transfer function remains stable, even when switching over occurs in a stable range p of the servo system.

FIG. 8 shows a second embodiment of the apparatus according to the invention. The servo-unit 15 is of substantially the same design as that shown in FIG. 7. The output signal of the amplifier 20, however, is now applied to a switch 23, which in a first position directly supplies the output signal to the adder unit 21 and in a second position via an inverting amplifier stage 24. The switch 23 is actuated by a control unit 25, which receives the control signal $I_2'$ supplied by the squarewave shaper 18. When the control system enters an unstable range, the switch 23 is set to the second position, so that the generated damping term is additionally inverted. As a consequence, the damping term also causes a positive damping in the unstable range.

The method of influendcing the transfer function of the servo-unit 15 is not particularly suited to be employed in the method of obtaining the control signal described with reference to FIGS. 5 and 6. This is because if the control signal were changed over during a stable range, causing the sign of the damping term to be reversed, the control behavior in the stable range would seriously be disturbed.

FIG. 9 shows a third embodiment of the apparatus according to the invention. The servo-amplifier 15 is identical to that of FIG. 7. However, in this case the control signal supplied by the detector 17 is not fed to a squarewave shaper, but to a differentiator 26. In the case of a first control signal $I_1$ (see FIG. 10a) which satisfies formula (4) and a second control signal $I_2$ (see FIG. 10b) which satisfies formula (7), the differentiator 26 supplies a signal $dI_2/dt$ which satisfies the following formula:

$$\frac{dI_2}{dt} = -\frac{4 m \pi}{\lambda} \cdot \left( \sin \frac{r}{\lambda} 2\pi \cdot \right) \cdot \frac{dr}{dt} \qquad (9)$$

It follows from the formula that the differentiated signal $dI_2/dt$ is in phase or in phase opposition with the first control signal $I_1$, depending on the sign of $dr/dt$, i.e. the direction of the radial movement. Said datum is used for stabilizing the control system.

It is, for example assumed that the differentiated signal $dI_2/dt$ has the response $dI_2/dt(1)$ as shown in FIG. 10c, which signal is then exactly in phase opposition with the first control signal and thus denotes a positive value of $dr/dt$, i.e. a movement of the scanning point towards a greater value of $r$. From this signal $dI_2/dt$ (1) a squarewave signal $I_3(1)$ can be derived (see FIG. 10d with the aid of a threshold value detector 27, which detects when the differentiated signal exceeds a positive threshold D. The gain factor of the amplifier 22 is controlled with the squarewave control signal $I_3(1)$ in such a way that the gain factor is reduced if the control signal is positive.

This means that the gain is reduced during the first part of the negative half period of the first control signal $I_1$. Assuming again that a positive value of said control signal $I_1$ tends to cause a movement of the scanning point towards a smaller value of $r$ and a negative value a movement towards a greater value, this reduction of the gain during the negative half period will result in a stabilization of the control system. When passing through an even number of positive and negative half periods of the control signal $I_1$, the energy which is exchanged during the positive half period which counteracts the movement towards a greater value of $r$ which still persists at that instant, is greater than the energy which is exchanged during the negativve half periods, which tends to maintain the movement. As a result, said prevailing movement is damped.

If the movement of the scanning point is exactly the opposite, i.e. $dr/dt < O$, the signal $dI_2/dt$ (2) shown in FIG. 10c is produced as a differentiated second control signal, from which via the threshold detector 27 the squarewave signal $I_3(2)$ (FIG. 10d) is derived. The gain of the transfer function is then reduced during a part of the positive half periods of the first control signal $I_1$, so that the desired stabilizing action is obtained again.

If the threshold D (FIG. 10c) of the threshold detector 27 is selected to be zero, the gain factor will be reduced either during the entire positive or the entire negative half period of the first control signal $I_1$, irrespective of the speed of the radial movement. This is less desirable, because in this case the gain factor would also be switched continually if the scanning point would move in the stable range around the desired stable settings ($s_1$, $s_2$, $s_3$ etc).

This is prevented by selecting a threshold value D other than zero. The amplitude of the differentiated second control signal $dI_2/dt$ is proportional to the magnitude of the speed of movement of the scanning point.

At a higher amplitude of the differentiated control signal (see for example $dI_2/dt$ (3) in FIG. 10c) a squarewave signal (see $I_3(3)$ in FIG. 10e) is obtained with the aid of a threshold value D which is not zero, whose positive pulse width increases approximately proportionally to said amplitude. This means that the stabilizing action is proportional to the magnitude of the speed.

If the speed decreases owing to said stabilizing action, the pulse width of the squarewave signal $I_3$ also decreases, which means that the switching points of the gain factor further recede from the desired settings ($s_1$, $s_2$, $s_3$ etc), so that automatically the desired range with a fixed transfer function is obtained around said settings. In the extreme case the speed is so small, that the amplitude of the signal $dI_2/dt$ is smaller than the threshold value D, so that no squarewave signal $I_3$ is produced any longer. However, this situation is merely hypothetic because before such a situation can occur the control system is already locked in a stable range.

In a modification of the embodiment described hereinbefore the differentiated second control signal $dI_2/dt$ of formula (9) is again multiplied by the first control signal, which yields $$\frac{dI_2}{dt} \cdot I_1 = \frac{8\,m^2\,\pi}{\lambda}\left(\sin\frac{r}{\lambda}2\pi\right)^2 \cdot \frac{dr}{dt} \quad (10)$$

The polarity of this signal is a direct indication of the direction of the radial movement. By reducing the gain depending on said polarity, either during the positive or during the negative half period of the first control signal $I_1$, the desired stabilizing action is obtained again. Thus, in this case a threshold value detector is required to which the first control signal $I_1$ is applied and which in accordance with the polarity of signal expressed by the formula (10) either during the positive or the negative half period of the first control signal supplies a control pulse to the amplifier 22 in the servo-unit. By giving the threshold value detector a threshold which is not zero, a range which is situated around the desired settings ($s_1$, $s_2$, $s_3$ etc. is excluded, so that a fixed transfer function is operative in this range under all conditions.

In a second modification the differentiator 26 is designed in a special manner, for example as shown in FIG. 11. This embodiment of the differentiator includes an operational amplifier V, whose inverting input is connected to ground via a capacitor C and via a resistor R to the output. The second control signal $I_2$ supplied by the detector 17 is fed to the non-inverting input of the operational amplifier V.

If it is assumed that the signal $I_2$ satisfies the equation of formula (7), the output signal $I_4$ of the operational amplifier V will be:

$$I_4 = I_2 + CR\frac{dI_2}{dt} = 2m\cos\frac{r}{\lambda}\cdot 2\pi - \frac{4\,m\,\pi}{\lambda}CR\left(\sin\frac{r}{\lambda}2\pi\right)\frac{dr}{dt} \quad (11)$$

For a rapid radial movement of the scanning point the second term is predominant, so that in this case the system operates substantially in accordance with the stabilizing method described with reference to FIGS. 9 and 10, because the signal $I_4$ then substantially corresponds to the signal $dI_2/dt$ of formula (9). However, if the speed $dr/dt$ of the radial movement decreases, the influence of the first term of formula (11) increases, until it finally becomes predominant. In this last borderline case the signal $I_4$ fully corresponds to the control signal $I_2$, so that the system then operates in accordance with the stabilizing method given in FIGS. 7 and 8 in combination with FIG. 3. Thus, depending on the speed one stabilizing method gradually merges into the other.

An additional advantage of the stabilizing method is the fact that for rapid movements the threshold value for the system may be zero without causing any problems, so that maximum stabilization is possible. This because at low speed the other stabilizating method is adopted.

A similar behavior can also be obtained with the aid of a "poor" differentiator, for example as shown in FIG. 12. The differentiating network then consists of the parallel connection of a resistance $R_1$ and a capacitance $C_1$ in series with a resistance $R_2$. The transfer function of said network is $$\frac{R_2(1 + pc\,R_1)}{(R_1 + R_2) + pc\,R_1 R_2} \quad (12)$$

where $p$ is the imaginary angular frequency. If $$\frac{1}{CR_1} < p < \frac{1}{CR_1}\frac{R_1 + R_2}{R_2} \quad \text{formula (12)}$$

may be approximated by $$p\frac{CR_1 R_2}{R_1 + R_2} \quad (13)$$

which implies a pure differentiation. For $p < 1/CR_1$, however, the transfer function may be reduced to $$\frac{R_2}{R_1 + R_2} \quad (14)$$

which is a normal voltage division. At relatively high frequencies, i.e. at high speed, the signal $I_2$ is differentiated, so that the stabilizing method of FIG. 9 is obtained, while at lower frequencies, i.e. at low radial speed, the stabilizing method of FIGS. 7 and 8 is obtained with a continuous transition, between these two methods.

It is obvious, tht the embodiment of the servo-unit is not limited to the embodiments shown in FIGS. 7, 8 and 9. For example, it is also possible to realize a damping term with the aid of suitable transducers at the drive element 10 or the mirror 8. There are numerous embodiments of and the methods in which the amplifier 20 and/or 22 can be influenced by the control signal, because this type of amplifier is known in many versions, and selecting a suitable amplifier in accordance with the requirements imposed and influencing the gain factor thereof in the correct manner will not present any problem to those skilled in the art.

What is claimed is:

1. An apparatus for reading a discshaped record carrier on which signals are stored in substantially circular adjacent tracks, which apparatus comprises a radiation source which emits a radiation beam, a read detector, directing means for projecting said radiation onto the record carrier as a read spot of radiation at a scanning point on the record carrier, for transferring the information contained in the scanninng point of the record carrier to the read detector and for radially positioning the read beam on the record carrier, said directing means being capable of scanning said radiation beam across several adjacent tracks of said record carrier, a control system in said directing system for controlling the radial position of the information contained in the scanning point of the desired track on the read detector, which control system includes a drive means for the directing system and a first measuring system for measuring the radial position of the scanning point and for supplying a corresponding first control signal to the drive means, which first measuring system further comprises means for projecting a first pattern of radiation spots on the record carrier, a first measuring detector means for supplying a first control signal, which during a radial movement of the scanning point over a number of track distances includes a periodic a.c. component whose period equals the distance between adjacent tracks divided by the speed of the radial movement of the scanning point, the control system being stable for one half period of the said a.c. component and being unstable for the other half period of the control system, a second measuring system, said second measuring system comprising a second measuring detector, means for projecting a second pattern of radiation spots onto the record carrier and for imaging the second pattern onto said second measuring detector, said second pattern of radiation spots being radially shifted with respect to said first pattern of radiation spots, means connected to said second measuring detector for supplying a second control signal, which upon radial movement of the scanning point over a number of track distances contains a periodic a.c. component whose period equals the track distance divided by the speed of the radial movement of the scanning point, but which a.c. component as a result of said radially shifted position of the second pattern of radiation spots relative to that of the first pattern of radiation spots exhibits a phase shift of substantially a quarter period relative to the a.c. component of the first control signal, processing means for deriving a third control signal from said second control signal, said third control signal indicating said unstable half periods of said control system, a control unit, said control system having a variable transfer function which is controlled by said control unit which receives said third control signal which is derived from the second control signal, said control unit upon a movement of the scanning point over a number of track distances alters the transfer function of said control system in response to said instability indications of said third control signal, whereby said control system is stabilized.

2. An apparatus as claimed in claim 1, wherein the third control signal is a squarewave signal, which is substantially in phase with the second control signal.

3. An apparatus as claimed in claim 1, wherein said processing means comprises a differentiation circuit, and means for applying the second control signal from said second control signal supplying means to an input of said differentiation circuit.

4. An apparatus as claimed in claim 3, wherein the third control signal is a squarewave signal, said processing means further comprising threshold value detection means for detecting the periods in which the differentiated second control signal exceeds a certain absolute threshold value and for supplying during said period a square-wave pulse the polarity at which at each moment is related to the polarity of the differentiated second control signal.

5. An apparatus as claimed in claim 3, wherein said processing means comprises a threshold value detector, which detects the periods in which the first control signal has specific polarity and at the same time exceeds a certain threshold value and during said periods supplies a squarewave pulse, selection between the two possible polarities of the first control signal to be detected being effected depending on the polarity of a product signal, which is the product of the first control signal and the differentiated second control signal.

6. An apparatus as claimed in claim 1, wherein the gain factor of the transfer function is varied in accordance with the third control signal.

7. An apparatus as claimed in claim 1, wherein the damping term contained in the transfer function is varied depending on the third control signal.

8. An apparatus as claimed in claim 2, wherein the transfer function alternates between mutually inverse damping terms depending on the third control signal.

9. An apparatus as claimed in claim 1, wherein the second pattern of radiation spots consists of two radiation spots which are mutually shifted in a radial direction by a distance equal to half the track distance, each of said radiation spots of said second pattern being imaged onto a separate part of the second measuring detector, the second control signal being obtained by subtraction of the signals supplied by the individual parts of the second measuring detector.

10. An apparatus as claimed in claim 1, wherein the second measuring signal is obtained by measuring the low-frequency component of the signal which is supplied by the read detector.

11. An apparatus as claimed in claim 3, wherein the differentiation circuit includes an operational amplifier having inverting and a non-inverting inputs, to the non-inverting input of which the second control signal is applied and whose inverting input is connected to a point of constant potential via a capacitance and to the output of the operational amplifier via a resistance.

12. An apparatus as claimed in claim 3, wherein the differentiation circuit comprises a network which for comparatively low frequencies provides an output at least substantially proportional to the input thereof and at comparatively high frequencies provides an output that is a substantially differentiated version of the input thereof.

13. An apparatus for reading a disc-shaped record carrier on which signals are stored in substantially circular adjacent tracks, which apparatus comprises a radiation source which emits a radiation beam, a read detector, means for projecting said radiation onto the record carrier as a read spot of radiation at a scanning point on the record carrier, directing system means for transferring the information contained in the scanning point of the record carrier to the read detector and for radially positioning the read beam on the record carrier, said directing means being capable of scanning said radiation beam across several adjacent tracks of said record carrier, a control system in said directing system for controlling the radial position of the information contained in the scanning point of the desired track on the read detector, which control system includes a drive means for the directing system and a first measuring system for measuring the radial position of the scanning point and for supplying a corresponding first control signal to the drive means, which first measuring system further comprises means for projecting a first pattern of radiation spots on the record carrier, a first measuring detector means for supplying a first control signal, which during a radial movement of the scanning point over a number of track distances includes a periodic a.c. component whose period equals the distance between adjacent tracks divided by the speed of the radial movement of the scanning point, the control system being stable for one half period of the said a.c. component and being unstable for the other half period of the control system, a second measuring system, said second measuring system comprising a second measuring detector, means for projecting a second pattern of radiation spots onto the record carrier and for imaging the second pattern onto said second measuring detector, said second pattern of radiation spots being radially shifted with respect to said first pattern of radiation spots, means connected to said second measuring detector for supplying a second control signal, which upon a radial movement of the scanning point over a number of track distances contains a periodic a.c. component whose period equals the track distance divided by the speed of the radial movement of the scanning spot, but which a.c. component as a result of said radially shifted position of the second pattern of radiation spots relative to that of the first pattern of radiation spots exhibits a phase shift of substantially a quarter period relative to the a.c. component of the first control signal, processing means for deriving a third control signal from said second control signal, said third control signal indicating the radial direction of motion of said read beam, a control unit, said control system having a variable transfer function which is controlled by said control unit which receives said third control signal which is derived from the second control signal, said control unit upon a movement of the scanning point over a number of track distances alters the transfer function of said control system in response to said directional indications of said third control signal, whereby said control system is stabilized.

* * * * *

UNITED STATES PATENT AND TRADEMARK OFFICE
CERTIFICATE OF CORRECTION

PATENT NO. : 4,037,252

DATED : July 19, 1977

INVENTOR(S) : JOHANNES MICHIEL JANSSEN

It is certified that error appears in the above-identified patent and that said Letters Patent are hereby corrected as shown below:

Col. 2, line 35, after "respect" should be --track--;

Col. 4, line 19, "presents" should be --present--;

Col. 6, line 11, after "to" should be --a--;

line 38, after "the" should be --two--;

line 42, "form" should be --from--;

line 43, "conains" should be --contains--; after "component" should be --whose period equals the track distance--;

Col. 7, line 24, "separation" should be --separations--;

Col. 9, line 1, equation 5, "1/2" should be --1/4--;

line 9, equation 6, "1/2" should be --1/4--;

Col. 10, line 13, "Said" should be --The--;

line 23, "Said" should be --The--;

line 54, "Said" should be --This--;

Col. 11, line 27, "ampllifier" should be --amplifier--;

UNITED STATES PATENT AND TRADEMARK OFFICE
CERTIFICATE OF CORRECTION

PATENT NO. : 4,037,252

DATED : July 19, 1977

INVENTOR(S) : JOHANNES MICHIEL JANSSEN

It is certified that error appears in the above-identified patent and that said Letters Patent are hereby corrected as shown below:

Col. 12, line 45, "negativve" should be --negative--;

Col. 14, line 42, "signalI$_2$" should be --signal I$_2$--;

line 48, "tht" should be --that--;

Claim 1, line 1, "discshaped" should be --disc-shaped--;

Claim 4, line 7, "at" first occurence should be --of--;

Claim 8, line 2, after "between" should be --two--;

Signed and Sealed this

Twenty-second Day of November 1977

[SEAL]

Attest:

RUTH C. MASON
Attesting Officer

LUTRELLE F. PARKER
Acting Commissioner of Patents and Trademarks